Oct. 31, 1961 J. J. HAGOPIAN 3,007,143

APPARATUS FOR READING STORED INFORMATION FROM OVERLAPPING RECORDED PULSES

Filed Oct. 17, 1955 6 Sheets-Sheet 1

INVENTOR.
Jacob J. Hagopian

BY Lippincott and Smith

Attorneys

Oct. 31, 1961 J. J. HAGOPIAN 3,007,143

APPARATUS FOR READING STORED INFORMATION FROM OVERLAPPING RECORDED PULSES

Filed Oct. 17, 1955 6 Sheets-Sheet 2

INVENTOR.
Jacob J. Hagopian

BY Lippincott and Smith

Attorneys

Oct. 31, 1961 J. J. HAGOPIAN 3,007,143

APPARATUS FOR READING STORED INFORMATION FROM OVERLAPPING RECORDED PULSES

Filed Oct. 17, 1955 6 Sheets-Sheet 3

INVENTOR.
Jacob J. Hagopian
BY Lippincott and Smith
Attorneys

Oct. 31, 1961 J. J. HAGOPIAN 3,007,143

APPARATUS FOR READING STORED INFORMATION FROM OVERLAPPING RECORDED PULSES

Filed Oct. 17, 1955 6 Sheets-Sheet 4

INVENTOR.
Jacob J. Hagopian
BY Lippincott and Smith
Attorneys

INVENTOR.
Jacob J. Hagopian
BY Lippincott and Smith
Attorneys

INVENTOR.
Jacob J. Hagopian
BY Lippincott and Smith
Attorneys

United States Patent Office 3,007,143
Patented Oct. 31, 1961

3,007,143

APPARATUS FOR READING STORED INFORMATION FROM OVERLAPPING RECORDED PULSES

Jacob J. Hagopian, San Jose, Calif., assignor to International Business Machines Corporation, New York, N.Y., a corporation of New York Filed Oct. 17, 1955, Ser. No. 540,753
24 Claims. (Cl. 340—174.1)

This invention relates to apparatus for reading stored binary information from a waveform of overlapping positive and negative pulses, and in particular to self-clocking reading apparatus for NRZ (non-return to zero) magnetic recording systems.

In digital computers and the like, binary information may be represented by a sequence of positive and negative pulses, and such information may be stored by recording a sequence of positive and negative magnetic pulses upon a magnetic tape, wire, disc, drum or other magnetizable medium. When the magnetic pulses are placed so close together that they overlap, with the "head" of each pulse recorded over the "tail" of the preceding pulse, a NRZ or "non-return to zero" recording system is provided. In addition to other advantages, the NRZ recording system can store a large amount of information in a small space.

Heretofore, a disadvantage of NRZ recording systems has been the necessity for providing auxiliary means, such as an additional recording channel generally called a "clock track," to generate timing signals for interpreting signals reproduced from the recorded NRZ magnetic waveform. In other words, because the NRZ waveform is continuous and consists of pulses overlapping one another, timing signals have been needed to establish the location of each individual pulse on the record, so that the overlapping pulses could be separated. This has led to serious problems in multiple-access information storage systems where it became necessary to maintain close mechanical alignment of the various reproducing heads relative to the master clock track. Furthermore, certain recording media such as magnetic wire do not permit the use of parallel recording channels.

Accordingly, a principal object of this invention is to provide self-clocking reading apparatus for NRZ recording systems, and to eliminate the need for an auxiliary recording channel or "clock track." Other objects and advantages will appear as the description proceeds.

Briefly stated, in accordance with one aspect of this invention, there is produced from an NRZ magnetic waveform, in a manner hereinafter explained, an electric signal with a ripple component having one cycle for each of the recorded magnetic pulses. This ripple component is used as a timing signal to trigger the generation of separate electric pulses that represent the stored information. Principles of this invention may also be used in reading information from non-magnetic waveforms, as in photographic and electrostatic information storage systems for example.

The invention will be better understood from the following description taken in connection with the accompanying drawings, and its scope will be pointed out in the appended claims. In the drawings, FIG. 1 is a schematic block diagram of apparatus embodying principles of this invention;

Figure 1:
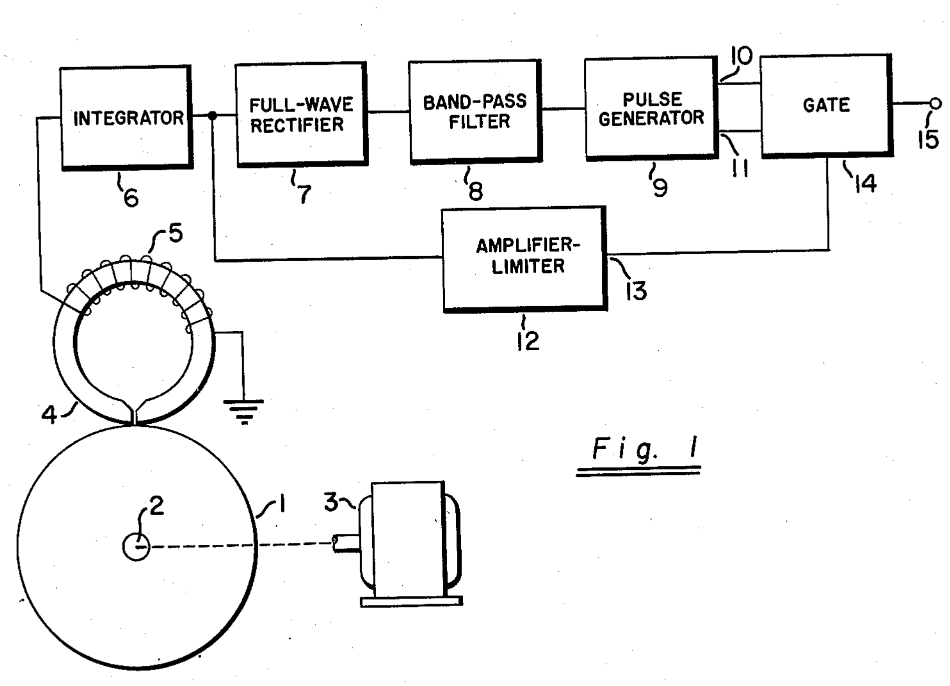

Referring now to FIG. 1 of the drawings, a magnetic drum 1 is rotated about shaft 2 by suitable means such as an electric motor 3. Drum 1 carries a previously-recorded unsaturated magnetic waveform of overlapping positive and negative magnetic pulses representing stored binary information. A magnetic disc, tape, wire, or other information storage device may replace drum 1. As drum 1 rotates, successive portions of the magnetic record are moved past a reproducing head or transducer 4 which produces an electric signal having a waveform similar to the first differential of the recorded magnetic waveform. Transducer 4 may be a conventional magnetic recording and reproducing head consisting of a magnetic core having a small gap adjacent to the magnetic record and having a winding 5 in which an electric signal is produced by changes in the magnetic flux passing through the core from successive portions of the recorded magnetic waveform which move past the gap.

An electric integrator 6 integrates the electric signal produced by the reproducing head and provides an integrated electric signal having a waveform similar to the recorded magnetic waveform. If desired, a transducer such as a magnetic amplifier type of reproducing head may be employed that provides directly an electric signal having a waveform similar to the recorded waveform, in which case the integrator is omitted.

A full-wave rectifier 7 inverts negative portions of the integrated signal relative to positive portions of the integrated signal, and thereby produces an electric signal with a ripple component having successive cycles occurring at the same rate as the rate at which magnetic pulses of either polarity move past the reproducing head. A band-pass filter 8 transmits only the ripple component to a pulse generator 9 which is triggered by each cycle of the ripple component to produce a separate positive electric pulse at its output terminal 10 and a separate negative electric pulse at its output terminal 11. Consequently, both a positive and a negative electric pulse are produced as each magnetic pulse of either polarity passes the gap of the reproducing head.

The integrated electric signal provided by integrator 6 is amplified and clipped by an amplifier-limiter 12, which supplies at its output terminal 13 a rectangular-waveform signal which controls a gate 14 in such a way that gate 14 transmits only the positive pulse produced by pulse generator 9 whenever the integrated signal has one polarity and transmits only the negative electric pulse produced by pulse generator 9 whenever the integrated signal has the opposite polarity. Consequently, gate 14 transmits to output terminal 15 a sequence of separate positive and negative electric pulses which represent the stored binary information.

Figure 2:
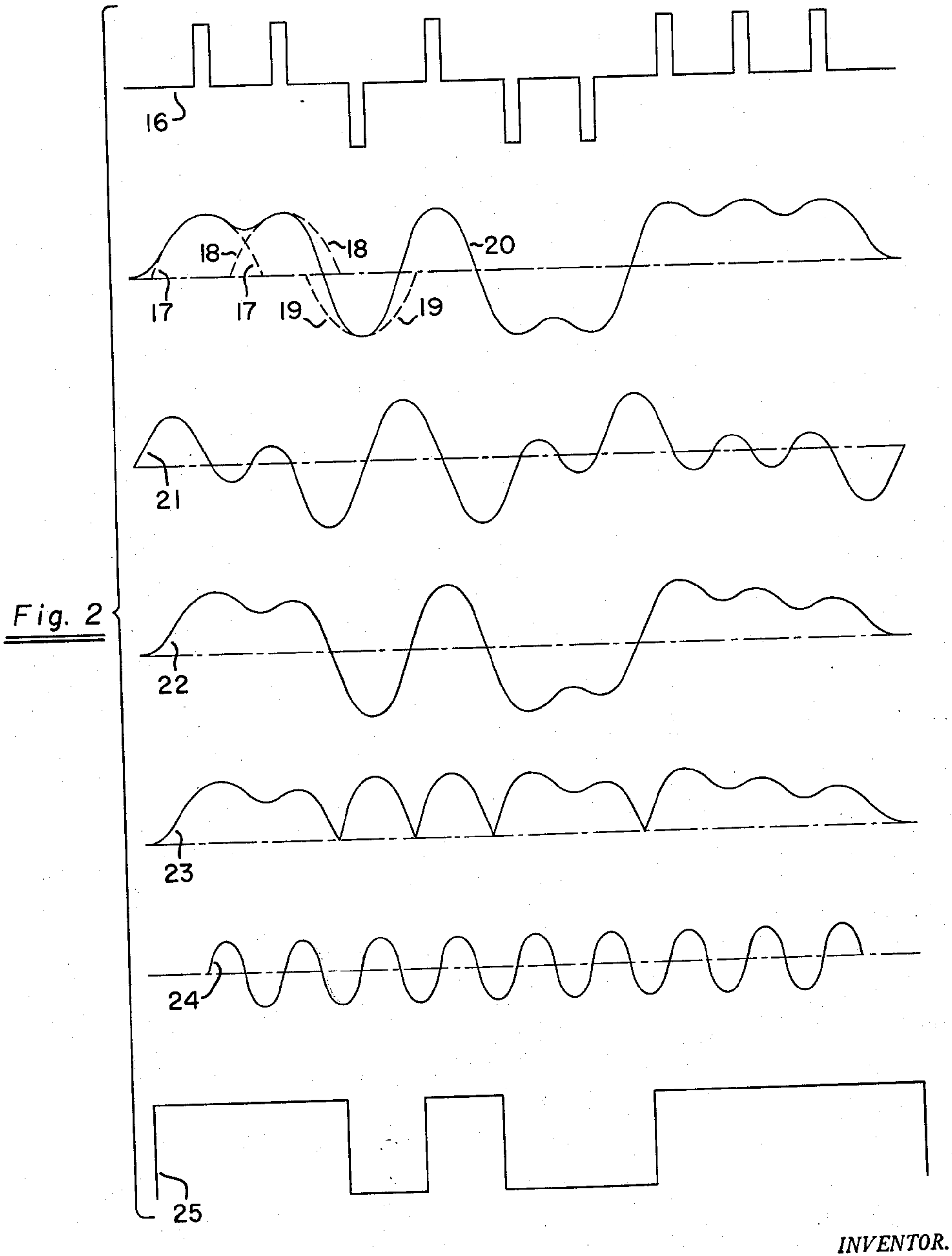
FIG. 2 is a group of curves used in explaining the invention.

Reference is now made to FIG. 2, which illustrates waveforms that are helpful in understanding the invention. Curve 16 represents a train or sequence of separate positive and negative pulses corresponding to the stored binary information. Separate pulses of this type present the information in a form suitable for processing by conventional digital computers and the like, and it is desired that the information stored on drum 1 be converted into a similar sequence of separate positive and negative electric pulses. In an NRZ magnetic information-storage system, the stored information is recorded upon the drum 1, or other magnetic storage medium, in the form of positive and negative magnetic pulses that overlap in the manner indicated by broken curves 17, 18 and 19, to produce on the drum a magnetic waveform of the type represented by solid curve 20. The amplitude of the recorded pulses is insufficient to saturate completely the magnetic record, so that waveform 20 has small troughs between adjacent magnetic pulses of the same polarity, as shown. Peaks of the recorded pulses may or may not saturate the magnetic medium, such saturation of the peaks being inmaterial so long as the peaks of the recorded pulses are separated by unsaturated portions of the magnetic waveform.

Alternatively, the magnetic pulses recorded on the record may be very narrow and separated, as in curve 16, but spaced so closely together relative to the resolving power of the reproducing head that the recorded pulses appear to the reproducing head to be overlapping as in curve 20. In either case, the magnetic flux passing from the record through the reproducing head has an NRZ waveform similar to curve 20, and in effect the pulses are overlapping.

As successive portions of the record pass the reproducing head, magnetic flux from the record passes through the magnetic core of the reproducing head. Changes in this flux induce in winding 5 an electric signal having a waveform, represented by curve 21, similar to the first differential of the magnetic waveform produced in the reproducing head by the recorded pulses. Although curve 21 contains the stored information, it is not in a form suitable for processing by conventional computers and other binary apparatus. Therefore, curve 21 must be "interpreted" to convert the stored information into a more easily understood form. After integration of the signal from the reproducer head by integrator 6, the integrated electric signal has a waveform such as that illustrated by curve 22, which is similar to the magnetic waveform and ideally is identical to the magnetic waveform. In practice, some distortion is introduced by the reproducing and integrating equipment, and waveform 22 generally is not exactly identical to waveform 20. However, with reproducing and integrating apparatus of reasonable quality the waveforms 20 and 22 are sufficiently alike for purposes of this invention.

Full-wave rectifier 7 inverts negative portions of the integrated signal relative to positive portions of the integrated signal—that is, the rectifier inverts portions of the integrated signal produced from negative magnetic pulses relative to portions of the integrated signal produced from positive magnetic pulses. After passing through rectifier 7, the signal has a waveform such as that illustrated by curve 23, with a ripple component represented by curve 24, having one cycle for each magnetic pulse of either polarity.

It will be noted that this ripple component cannot be derived directly from any of the curves 20, 21 and 22. In fact, curves 20, 21 and 22 would have a ripple component at a frequency equal to the repetition rate of the pulses only if all of the recorded pulses had the same polarity. If the recorded pulses alternated in polarity, the ripple component of curves 20, 21 and 22 would be at one-half the desired frequency, and when the polarity of the recorded pulses varies in an irregular manner, as must necessarily be the case in an information-storage system, the phase relations of curves 20, 21 and 22 change in such a way that a constant-frequency ripple component is not identifiable.

Each cycle of the ripple component triggers pulse generator 9 to produce both a positive and a negative electric pulse, so that two trains or sets of electric pulses are produced in each of which there is one pulse for each magnetically recorded pulse of either polarity.

The integrated signal, curve 22, is amplified and clipped by amplifier-limiter 12 to produce at terminal 13 a signal having a rectangular waveform such as that illustrated by curve 25. This signal controls gate 14 so that the gate transmits only positive or negative pulses selectively. For example, curve 25 has a relatively large positive value during the first two cycles of curve 24, and gate 14 at this time transmits two positive pulses generated by pulse generator 9. During the next cycle of curve 24, curve 25 is relatively negative and gate 14 transmits the negative pulse produced by pulse generator 9. In the same way, pulse generator 9 produces both positive and negative pulses at each cycle of curve 24, and gate 14 transmits a selected one of these pulses, depending upon the value of curve 25, to produce a train or sequence of separate positive and negative electric pulses corresponding to the pulses represented by curve 16. This sequence of positive and negative electric pulses correctly represents the binary information stored on the magnetic drum.

Figure 3:
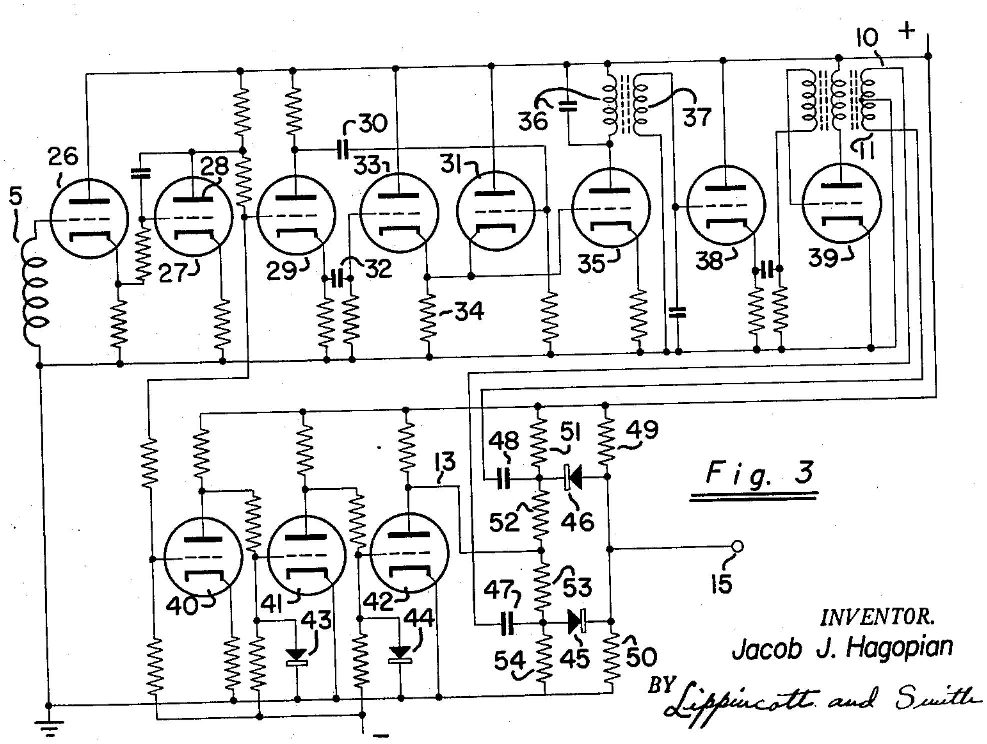
FIG. 3 is a simplified circuit diagram of the apparatus shown in FIG. 1.

FIG. 3 is a simplified circuit diagram of the apparatus shown schematically in FIG. 1. Referring to FIG. 3, winding 5 of the reproducing head is connected to the control grid of a vacuum tube 26 connected as a conventional cathode follower which supplies current to a conventional boot-strap integrator comprising vacuum tube 27. The integrator provides at anode 28 an integrated signal having a waveform similar to curve 22 but of opposite polarity. The integrated signal is supplied to the control grid of an inverter vacuum tube 29 which inverts and transmits the integrated signal through a capacitor 30 to the control grid of a vacuum tube 31, and transmits the integrated signal without inversion through a capacitor 32 to the control grid of a vacuum tube 33.

The cathodes of vacuum tubes 31 and 33 are connected together, as shown, and are connected to a common cathode resistor 34. The cathode potential of tubes 31 and 33 follows the more positive of the two control-grid potentials, thereby inverting negative portions of the integrated voltage relative to positive portions of the integrated voltage to produce a signal having a waveform similar to that represented by curve 23. Consequently, the circuit comprising grid-controlled vacuum tubes 31 and 33 is in effect a full-wave rectifier.

The rectified signal is supplied to a vacuum-tube amplifier stage 35 having a parallel resonant anode circuit 36, tuned to the ripple-component frequency, which acts as a bandpass filter to transmit substantially only the ripple component of the rectified signal. Consequently, secondary 37, which is inductively coupled to parallel resonant circuit 36, transmits to a conventional cathode follower 38 the ripple component represented by curve 24. Here as elsewhere throughout the drawings, the transformer windings are arranged so that the upper winding terminals are of like polarity. Cathode follower 38 is the driving stage of the pulse generator.

At each positive half-cycle of the ripple component, cathode follower 38 triggers a conventional blocking oscillator 39, or other pulse generator, which thereupon conducts a short pulse of current. As the current conducted by the blocking oscillator increases, a positive voltage pulse is produced in lead 10 and a negative voltage pulse is produced in lead 11. Subsequently, as the current conducted by the blocking oscillator decreases, voltages of opposite polarity are present at 10 and 11, but these are always blocked in the gate circuit hereinafter described.

The integrated signal is amplified and clipped by a conventional amplifier-limiter comprising three vacuum-tube amplifier stages 40, 41, and 42. The amplified signal is clipped by half-wave rectifiers 43 and 44 and by saturation and cut-off characteristics of stages 41 and 42 to provide a signal at 13 having a substantially rectangular waveform represented by curve 25.

A gate may be made from two half-wave rectifiers 45 and 46 connected between a pair of resistance-type voltage dividers, as shown. Rectifier 45 is connected to blocking oscillator terminal 10 through a capacitor 47, and has a polarity such that positive pulses produced at 10 may be transmitted through rectifier 45, while negative pulses at 10 are always blocked. Rectifier 46 is connected to blocking oscillator terminal 11 through a capacitor 48, and has a polarity such that negative pulses produced at 11 may be transmitted through rectifier 46 while positive pulses at 11 are always blocked. Output terminal 15 is connected to both of the rectifiers 45 and 46, and is maintained at a potential between the most positive and the most negative potentials of lead 13 by a voltage divider comprising resistors 49 and 50. The voltage divider comprising resistors 51, 52, 53 and 54 supplies bias reverse voltages across the two rectifiers 45 and 46.

When the potential at 13 is relatively positive with respect to output terminal 15, the reverse voltage across rectifier 45 is small and positive pulses produced at 10 by blocking oscillator 39 are transmitted through rectifier 45 to output terminal 15, while the reverse voltage across rectifier 46 is sufficiently large that negative pulses produced at 11 by oscillator 39 are blocked by rectifier 46. On the other hand, when the potential at 13 is relatively negative with respect to output terminal 15, the reverse voltage across rectifier 46 is small and negative pulses produced at 11 by blocking oscillator 39 are transmitted through rectifier 46, while a sufficient bias or reverse voltage is provided across rectifier 45 to block the positive pulse produced at 10. Consequently, the gate transmits only the positive pulses or the negative pulses, selectively, depending upon the polarity of the integrated signal. In this way a train or sequence of separate positive and negative pulses, corresponding to the pulses represented by curve 16, is produced at 15 to represent the stored binary information in a form suitable for subsequent processing by digital computing apparatus, counting registers, printing or display apparatus, and the like.

If the output pulses of one polarity only are needed by the computer or other apparatus receiving the pulses, one of the rectifiers 45 and 46 and its associated circuitry may be omitted.

Figure 4:
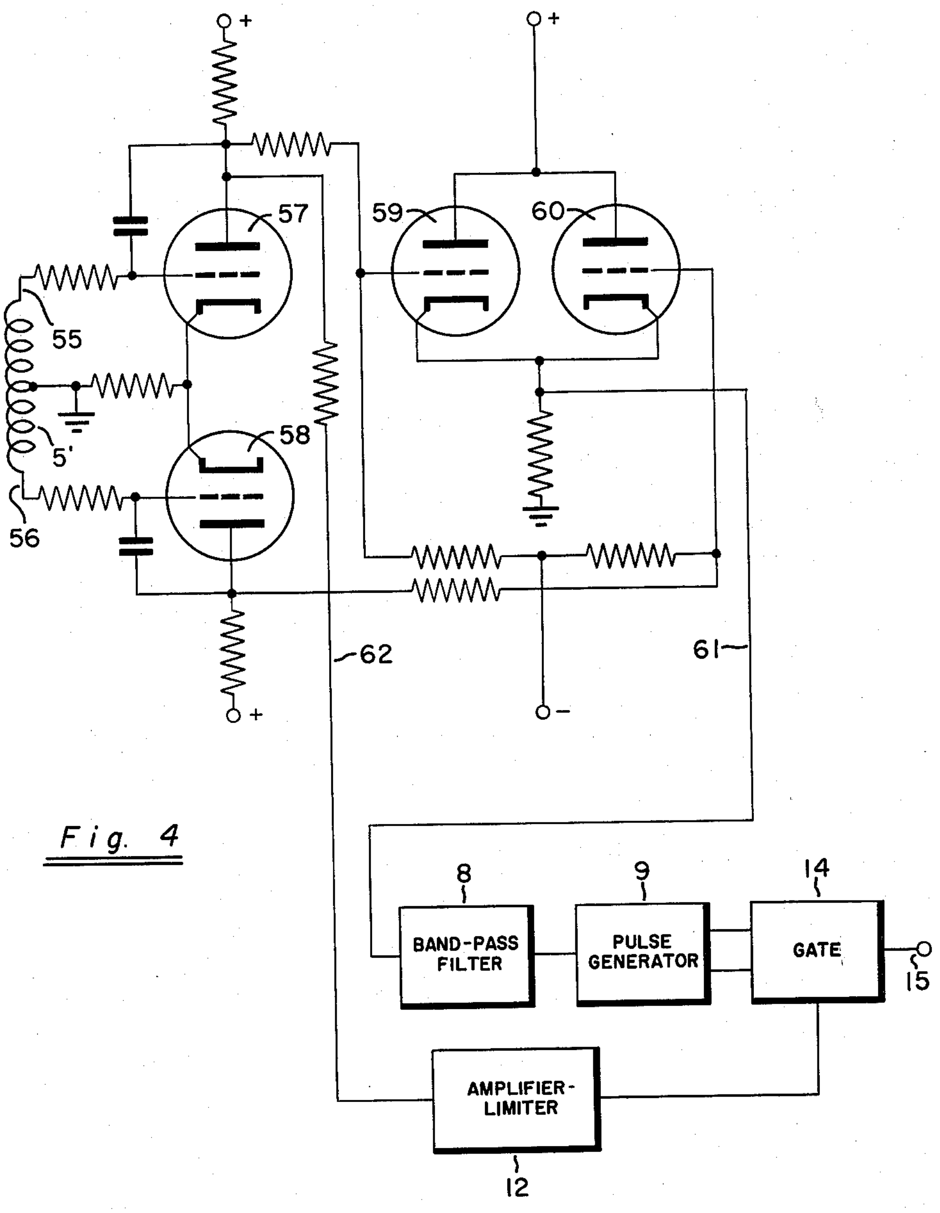
FIG. 4 is a partial circuit diagram showing a modification.

Reference is now made to FIG. 4, which illustrates a modification of the integrator and rectifier circuits. Other portions of the apparatus, except the reproducing head winding 5, may be identical to corresponding portions of the apparatus shown in FIGS. 1 and 3, and are identified by the same reference numerals used in FIG. 1. In the modification shown in FIG. 4, the reproducing head has a center-tapped winding 5′ in place of winding 5, the center tap of which is connected to ground or its circuit equivalent. Consequently, one terminal 55 of winding 5′ provides a signal having a waveform similar to that represented by curve 21, and the other terminal 56 of winding 5′ provides an inverted replica of this signal. These two signals are integrated by two boot-strap integrators 57 and 58, thereby providing to the control grids of triode vacuum tubes 59 and 60 two integrated voltages of similar waveform but opposite polarity. The cathodes of tubes 59 and 60 are connected together, and provide through lead 61 to a bandpass filter 8 (which may be similar to filter stage 35 of FIG. 3) a signal having a ripple component represented by curve 24. Thus tubes 59 and 60 constitute a full-wave rectifier similar to that provided by tubes 31 and 33. One of the two integrated voltages is supplied to an amplifier-limiter 12 (which may be similar to stages 40 through 42 of FIG. 3) through a lead 62.

Figure 5:
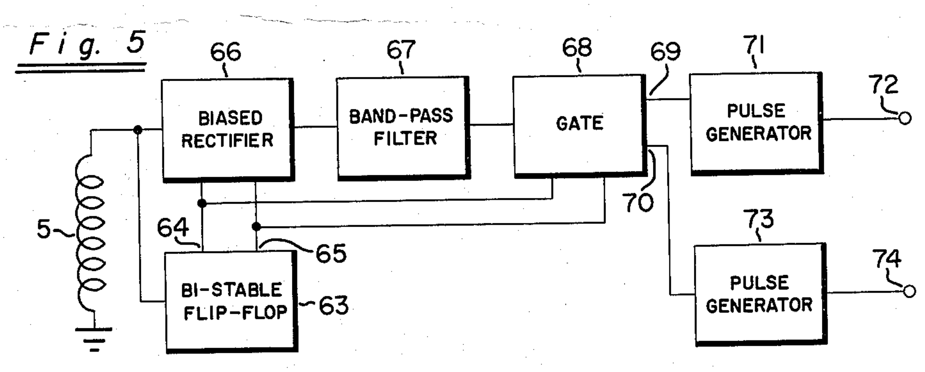
FIG. 5 is a schematic block diagram showing an alternative embodiment of the invention.

Reference is now made to FIG. 5 of the drawings, which illustrates an alternative embodiment of the invention. Winding 5 of the reproducing head provides an electric signal having a waveform similar to that represented by curve 21. It will be noted that portions of this signal produced from magnetic pulses following magnetic pulses of the opposite polarity have relative large amplitudes of either positive or negative polarity, while portions of the same signal produced from pulses following magnetic pulses of the same polarity have relatively small amplitudes. The larger-amplitude portions of this electric signal trigger a conventional bistable flip-flop 63 alternately from one to the other of its two operating states, so that each change in the polarity of the recorded pulses triggers bistable flip-flop 63 to a different operating state. Flip-flop 63 has two output leads 64 and 65 so arranged that the potential of lead 64 is positive relative to the potential of lead 65 when flip-flop 63 is in one operating state, while the potential of lead 64 is negative relative to the potential of lead 65 when the flip-flop is in its other operating state.

The signal produced by reproducing head winding 5 is transmitted through a biased rectifier 66 that is controlled by the operating state of flip-flop 63 to invert portions of the signal produced from negative magnetic pulses relative to portions of the same signal produced from positive magnetic pulses. Consequently, the biased rectifier produces a ripple component having one cycle for each magnetic pulse of either polarity.

This ripple component is transmitted through a bandpass filter 67 to a gate 68 controlled by the state of flip-flop 63 to transmit successive cycles of the filtered ripple component to an output terminal 69 of the gate when the flip-flop is in one operating state, and to transmit the filtered ripple component to an output terminal 70 of the gate when flip-flop 63 is in its other operating state. Each cycle of the ripple component transmitted to terminal 69 triggers a pulse generator 71 to provide a separate positive electric pulse at an output terminal 72. Each cycle of the ripple component transmitted to terminal 70 triggers a pulse generator 73 to provide a separate negative electric pulse at an output terminal 74. If desired, the positive and negative electric pulses may subsequently be combined by any suitable means.

Figure 6:
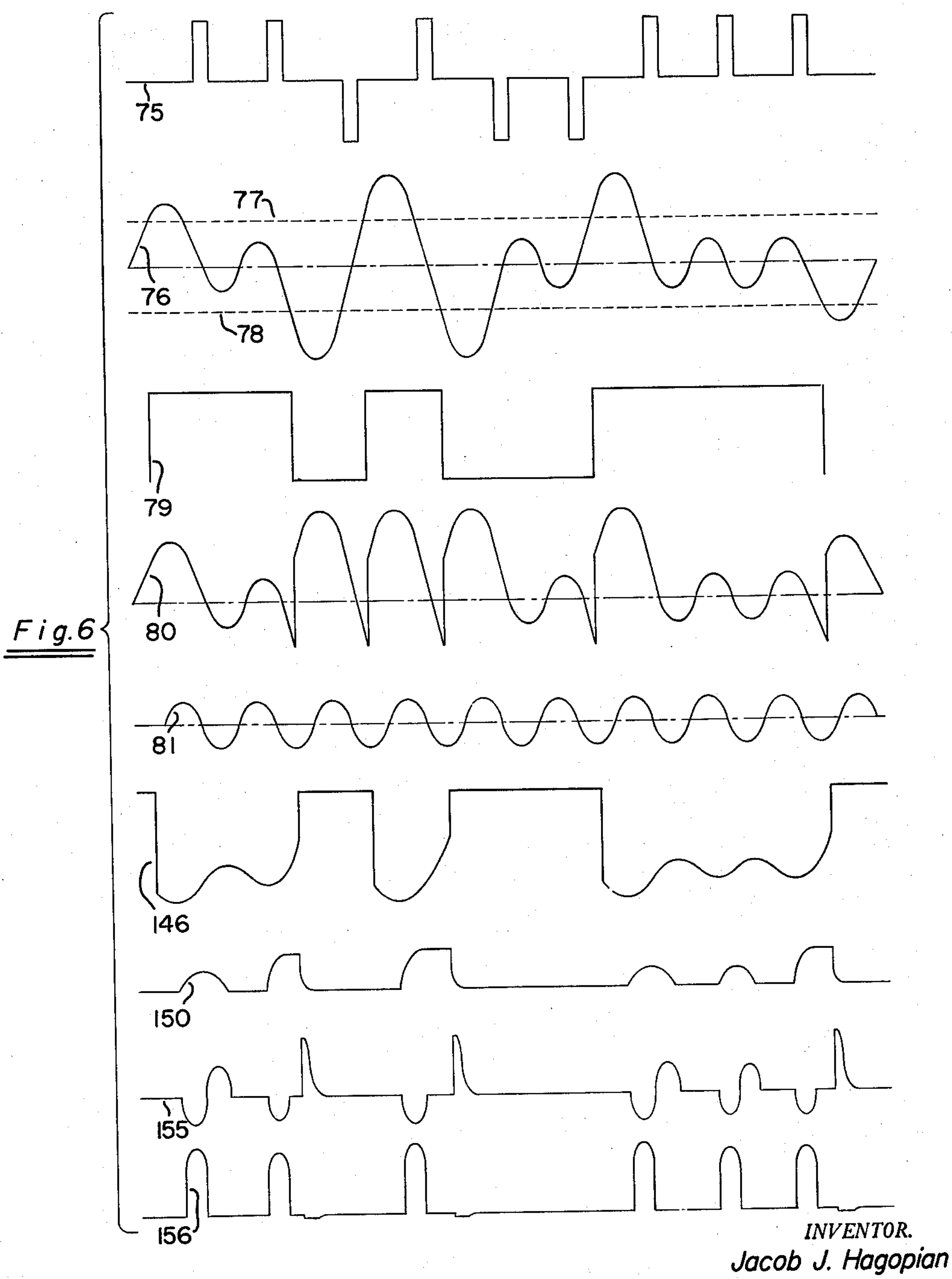
FIG. 6 is another group of curves used in explaining the invention.

Reference is now made to FIG. 6, which illustrates waveforms useful in understanding this last-discussed alternative embodiment of the invention. Curve 75, which is identical to curve 16 of FIG. 2, represents a train or sequence of separate positive and negative pulses corresponding to the stored binary information. The waveform of the electric signal provided by the reproducing head is represented by curve 76, which is similar to curve 21 of FIG. 2. Each change in the polarity of the recorded pulses results in a relatively large-amplitude positive or negative portion of curve 67, as shown. In other words, whenever a positive magnetic pulse follows a negative magnetic pulse, curve 76 has a portion of relatively large positive amplitude, and whenever a negative magnetic pulse follows a positive magnetic pulse, curve 76 has a portion of relatively large negative amplitude. Whenever a magnetic pulse has the same polarity as the preceding magnetic pulse, the ampiitude of curve 76 is substantially smaller.

Bistable flip-flop 63 is so designed or adjusted that signals from the reproducing head that have a positive amplitude greater than the value represented by broken line 77 trigger the bistable flip-flop 63 into a first one of its two operating states wherein the potential at lead 64 is more positive than the potential of lead 65; while signals having a negative amplitude larger than the value represented by broken line 78 trigger the bistable flip-flop 63 into the second of its two operating states wherein the potential of lead 65 is more positive than the potential of lead 64. Signals from the reproducer head that have amplitudes of either polarity smaller in magnitude than the values represented by the lines 77 and 78 are ineffective to trigger the bistable flip-flop from one state to the other. Consequently, each time that curve 76 crosses line 77 in a positive direction, bistable flip-flop 63 is triggered into its first stable operating state, in which the flip-flop remains until curve 76 crosses line 78 in the negative direction, whereupon bistable flip-flop 63 is triggered into its second stable operating state.

The bistable flip-flop provides through lead 64 to biased rectifier 66 and to gate 68 a voltage having a waveform similar to curve 79 of FIG. 6. This voltage has a relatively large positive value whenever flip-flop 63 is in its first operating state, and has a relatively negative value whenever flip-flop 63 is in its second operating state.

Flip-flop 63 supplies through lead 65 to biased rectifier 66 and to gate 68 a voltage having a waveform which is an inverted replica of curve 79.

The signal transmitted by biased rectifier 66 has a waveform represented by curve 80, which is similar to curve 76 except that in curve 80 portions of curve 76 produced from negative magnetic pulses are inverted relative to portions of curve 76 produced from positive magnetic pulses. Curve 80 has a ripple component, represented by curve 81, that has one cycle for each magnetic pulse of either polarity. This ripple component is transmitted to gate 68, and successive cycles of the ripple component are transmitted to terminal 69 of the gate whenever flip-flop 63 is in its first operating state, and are transmitted to terminal 70 of the gate whenever flip-flop 63 is in its second operating state.

Each cycle of the ripple component transmitted to terminal 69 triggers pulse generator 71 to provide a separate positive electric pulse at output terminal 72, so that a positive pulse is provided at terminal 72 for each of the positive pulses of curve 75. Similarly, each cycle of the ripple component transmitted to terminal 70 triggers pulse generator 73 to provide a separate negative electric pulse at output terminal 74, so that a negative pulse is provided at terminal 74 for each of the negative pulses of curve 75. These positive and negative pulses represent the stored binary information in a form which may be used by conventional digital computers and the like.

Figure 7:
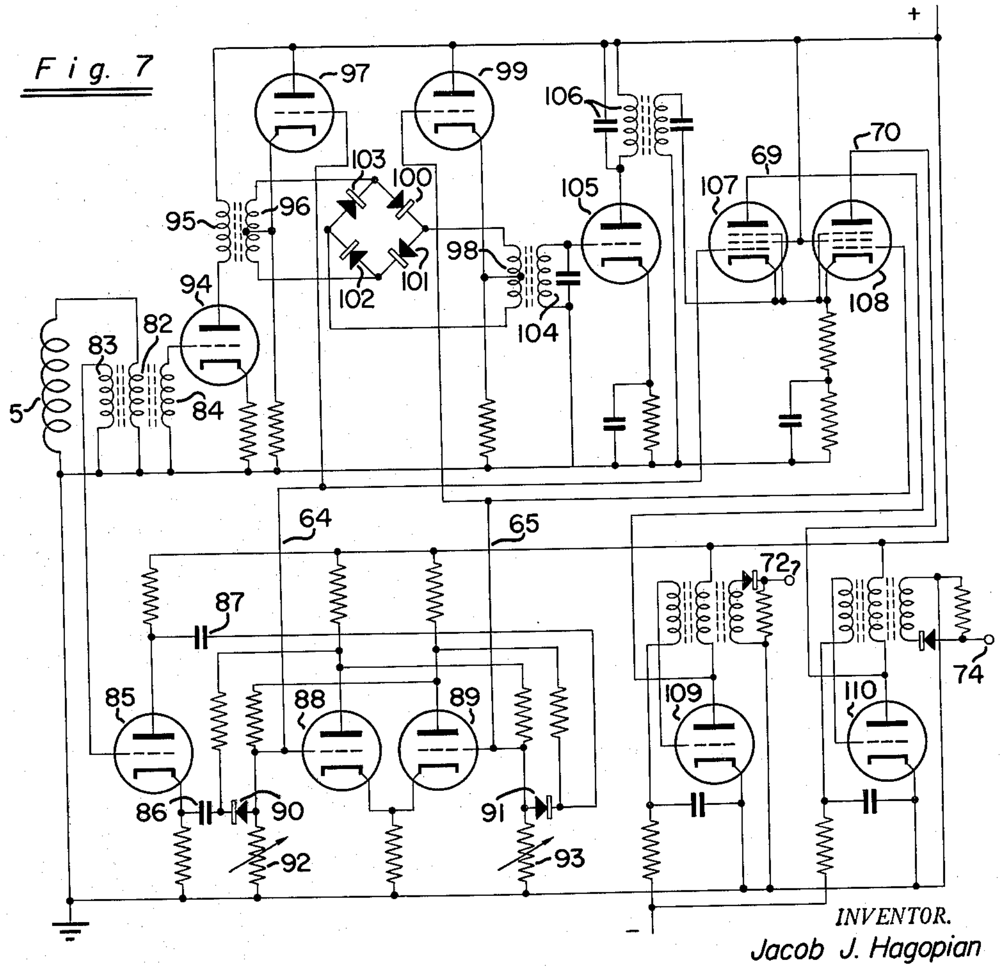
FIG. 7 is a simplified circuit diagram of the embodiment shown in FIG. 5.

Reference is now made to FIG. 7, which is a simplified circuit diagram of the apparatus shown schematically in FIG. 5. The reproducing head winding 5 provides an electric signal, having a waveform similar to curve 76, to the primary 82 of a transformer having two secondaries 83 and 84. Secondary 83 supplies a similar signal to a vacuum tube signal inverter 85 which transmits this signal without inversion through a capacitor 86 and transmits an inverted replica of the same signal through a capacitor 87.

A conventional bistable electronic flip-flop comprises two triode vacuum tubes 88 and 89 connected in a circuit such that only one of these tubes conducts current at any given time. This flip-flop has two stable operating states, in the first one of which tube 88 conducts current, while in the second one of which tube 89 conducts current. When tube 88 is conductive the potential of lead 64 is more positive than the potential of lead 65, and when tube 89 is conductive the potential of lead 65 is more positive than the potential of lead 64. The control grid of vacuum tube 88 is connected to capacitor 86 through a half-wave rectifier 90, while the control grid of tube 89 is connected to capacitor 87 through a half-wave rectifier 91.

When tube 88 is conductive, a relatively large reverse voltage is present across rectifier 91, so that in this state of the flip-flop no signal of either polarity is transmitted by rectifier 91. At the same time a relatively small reverse voltage is present across rectifier 90, so that rectifier 90 can transmit signals of negative polarity which exceed the value of this reverse voltage, the magnitude of which is determined by the circuit constants and thus is subject to design or adjustment, by adjusting the value of resistor 92, for example. Positive signals transmitted through capacitor 86 are blocked by rectifier 90 and have no effect upon the state of the flip-flop. Small negative signals transmitted by capacitor 86 are likewise blocked by rectifier 90, provided the amplitude of such signals is smaller than the reverse voltage across this rectifier.

When a signal of larger negative amplitude is produced by a negative magnetic pulse following a positive magnetic pulse, a negative signal is transmitted by capacitor 86 that is substantially larger than the reverse voltage across rectifier 90, whereupon a negative signal is transmitted to the control grid of tube 88 which renders this tube non-conductive. As tube 88 becomes non-conductive, its anode voltage rises and carries the control grid potential of tube 89 in a positive direction, whereupon tube 89 becomes conductive and tube 88 is cut off. Accordingly the large-amplitude negative signals which are produced from a negative magnetic pulse following a positive magnetic pulse are effective to trigger the bistable flip-flop from its first to its second operating state.

The bistable trigger remains in its second stable operating state until the next positive magnetic pulse produces a large-amplitude positive signal which is transmitted through capacitor 87 as a large-amplitude negative signal which drives the control grid of tube 89 to cut off in the negative direction, whereupon the flip-flop reassumes its first operating state. The signal amplitude required to trigger the flip-flop from its second to its first operating state may be adjusted by adjusting the value of resistor 93.

Transformer secondary 84 supplies a voltage that has a waveform similar to curve 76 to a vacuum tube amplifier 94 connected to the primary 95 of a transformer having a center-tapped secondary 96. Consequently, a current is provided through primary 95 that has a waveform similar to curve 76, and the magnetic flux in the transformer has a similar waveform. The center tap of secondary 96 is connected to lead 64 through a conventional cathode follower 97. Another transformer has a center-tapped primary 98 with its center tap connected to lead 65 through a conventional cathode follower 99. The transformer windings 96 and 98 are connected to a rectifier bridge or ring comprising four half-wave rectifiers 100, 101, 102 and 103 connected together in a series loop or ring as shown.

Whenever lead 64 is at a more positive potential than lead 65, which occurs during one operating state of the bistable flip-flop, current flows through rectifiers 100 and 102, while the relatively high back resistance of rectifiers 101 and 103 substantially blocks the flow of current through the latter two rectifiers and in effect creates an open circuit at 101 and 103. Since this current flows in opposite directions through the two halves of each center-tapped winding 96 and 98, it produces no appreciable net current or magnetic flux in either transformer. Under these conditions the signal from reproducing head winding 5 is transmitted from transformer winding 96 to transformer winding 98 without phase inversion.

On the other hand, in the other state of the bistable flip-flop lead 65 is at a potential more positive than that of lead 64, and current flows through rectifiers 101 and 103 and in effect creates an open circuit at 100 and 102. Now the signal from reproducing head winding 5 is inverted while being transmitted between transformer windings 96 and 98. Consequently, portions of the signal supplied by the reproducing head which are produced from negative magnetic pulses are inverted relative to portions of the same signal which are produced from positive magnetic pulses, thereby providing through winding 98 a net current having a waveform similar to curve 80, which produces in the transformer carrying winding 98 a magnetic flux of similar waveform. In other words, the rectifier ring 100—103 is biased by current produced from voltages supplied by the flip-flop 88—89, and thus is controlled by the operating state of the flip-flop to invert the phase of selected portions of a current signal between windings 96 and 98 that corresponds to the signal provided by the reproducing head.

The net current through transformer winding 98 has a ripple component which is represented by curve 81 and this ripple component is transmitted to secondary 104 of the transformer, which may be part of a resonant circuit tuned to the ripple-component frequency. The ripple component is amplified by a conventional vacuum-tube amplifier 105 having in its anode circuit a parallel-resonant circuit 106 that is tuned to the ripple-component frequency and that acts as a band-pass filter transmitting substantially only the ripple component. This ripple component is then transmitted to the cathodes of pentode vacuum tubes 107 and 108 which form part of the gate circuit for transmitting the ripple component either to a lead 69 or to a lead 70, selectively. Pentodes 107 and 108 also serve as the driving stages of the pulse generators.

Whenever the flip-flop is in the first one of its two stable operating states, lead 64 is at a potential more positive than that of lead 65, and vacuum tube 107 conducts current while vacuum tube 108 is cut off. In this operating state of the flip-flop, successive cycles of the ripple component are transmitted through lead 69 to a pulse generator, which may be a conventional blocking oscillator 109, that is triggered by each cycle of the ripple component to produce a separate positive electric pulse at output terminal 72.

Whenever the flip-flop is in its other operating state, lead 65 is at a potential more positive than that of lead 64, and tube 108 conducts current while tube 107 is cut off. Under these conditions successive cycles of the ripple component are transmitted through lead 70 to a pulse generator, which may be a conventional blocking oscillator 110, that is triggered by each cycle of the ripple component to produce a separate negative electric pulse at output terminal 74. If desired, the output pulses at 72 and 74 may be combined by any suitable mixing circuit. For example, terminals 72 and 74 may merely be connected together. When separate output circuits are employed for the two sets or trains of output pulses, both blocking oscillators may be designed to produce output pulses of the same polarity. When one set or polarity only of the output pulses is required, one of the blocking oscillators may be omitted.

Figure 8:
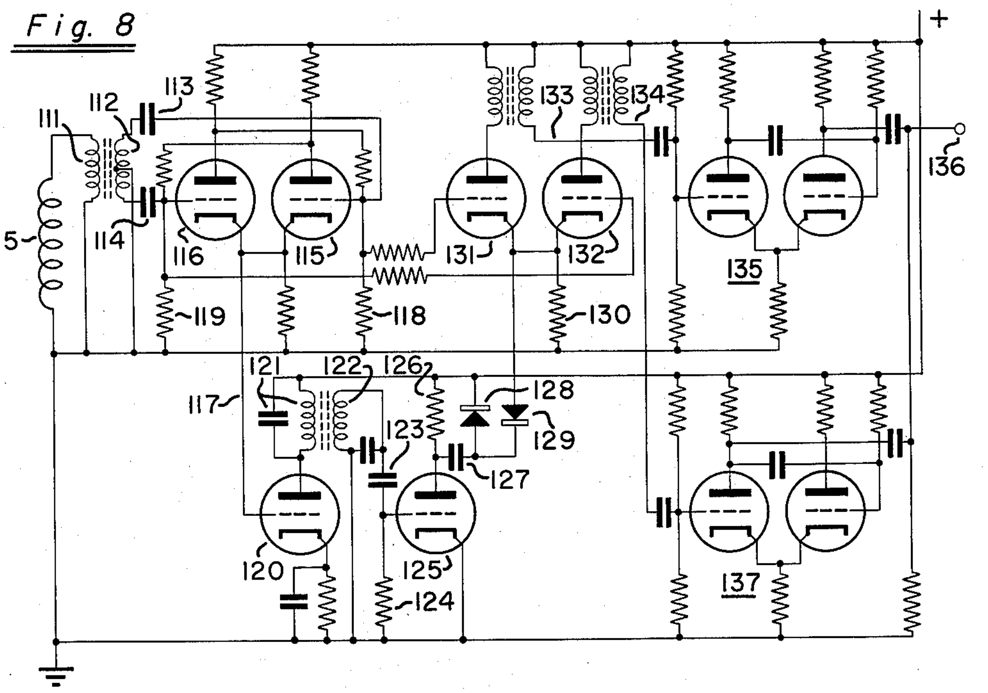
FIG. 8 is a simplified circuit diagram illustrating another alternative embodiment of the invention.

Reference is now made to FIG. 8 of the drawings, which illustrates an embodiment wherein a single bistable flip-flop performs the same functions as in FIG. 5, and also performs the functions of the biased rectifier. Reproducing head winding 5 supplies to transformer primary 111 a signal that has a waveform similar to curve 76. A center-tapped secondary 112 is inductively coupled to primary 111 and transmits through a capacitor 113 a signal that has a waveform similar to curve 76 while transmitting through a capacitor 114 an inverted replica of the same signal.

A conventional bistable electronic flip-flop comprises a triode vacuum tube 115 and a triode vacuum tube 116 having their cathodes connected together, as shown, and having control grids connected to capacitors 113 and 114 respectively. Tubes 115 and 116 are connected in a well-known flip-flop circuit having two stable operating states, in a first one of which tube 115 conducts current while tube 116 is cut off. In the other stable operating state of the flip-flop tube 116 conducts current while tube 115 is cut off.

Assume that the flip-flop is in its first operating state wherein tube 115 is conductive. A signal having a waveform similar to curve 76 is transmitted through capacitor 113 to the control grid of tube 115, and variations in the control grid potential thus produced are transmitted by the cathode of tube 115 to a lead 117. Signals of the opposite polarity are transmitted to the control grid of tube 116, both through capacitor 114 and through the anode circuit of tube 115. However, so long as the signals transmitted to the control grid of tube 116 are not of sufficient amplitude to make tube 116 conductive, the flip-flop remains in its first operating state.

Now assume that a relatively large-amplitude negative signal is provided by the reproducing head winding 5 from a negative recorded pulse following a positive recorded pulse. This negative signal is transmitted to the control grid of tube 115, and the cathode potential of both tubes is driven in the negative direction. At the same time the control grid potential of tube 116 is driven in the positive direction. When the signal is of sufficient amplitude to make tube 116 conductive, the anode potential of tube 116 begins to fall and the control grid of tube 115 is driven rapidly in the negative direction, whereupon tube 115 is cut off while tube 116 remains conductive, so that the flip-flop is triggered to its other stable operating state. Now the cathode potential of both tubes, and hence the signal supplied through lead 117, follows the signal supplied to the control grid of tube 116, which has a waveform that is an inverted replica of curve 76.

This second state of operation continues until a relatively large-amplitude positive signal is supplied by reproducing head winding 5 from a positive recorded pulse following a negative recorded pulse, whereupon the flip-flop is triggered back to its first operating state. Consequently, the cathode potential of tubes 115 and 116 has a waveform similar to curve 80, which is similar to curve 76 except that portions of the signal produced from negative magnetic pulses have been inverted in phase relative to portions of the same signal produced from positive magnetic pulses. The smallest signal amplitude that is effective to trigger the flip-flop from one to the other of its two operating states depends upon the circuit constants of the flip-flop, and consequently is subject to design or adjustment, by adjusting the values of resistors 118 and 119, for example.

As hereinbefore explained, the waveform represented by curve 80, which is transmitted through lead 117, has a ripple component, represented by curve 81, that has one cycle for each recorded magnetic pulse of either polarity. This ripple component is amplified by a conventional vacuum-tube amplifier 120 connected to a parallel-resonant circuit 121 which acts as a bandpass filter to transmit substantially only the ripple component. The filtered ripple component is transmitted to transformer secondary 122 connected to a differentiating circuit consisting of a capacitor 123 in series with a resistor 124, which advances the phase of the ripple component by substantially 90°. The ripple component is then amplified by an amplifier 125 which saturates on positive half-cycles and thus clips alternate half-cycles of the ripple component. Accordingly, there is produced across amplifier load resistor 126 a signal consisting of positive half-cycles corresponding to negative half-cycles of the ripple component. During each of the positive half-cycles across resistor 126, a small capacitor 127 alternately discharges a portion of its charge through a rectifier 128 and charges through a circuit consisting of a rectifier 129 and a resistor 130, connected in series as shown, whereby a train of short positive pulses is produced across resistor 130, one such pulse occurring for each recorded magnetic pulse of either polarity.

A gate consists of two triode vacuum tubes 131 and 132 having their cathodes connected together and to resistor 130. The control grids of tubes 131 and 132 are connected to the control grids of tubes 115 and 116, respectively, so that only one of the tubes 131 and 132 is conductive at any one time, the tube which is conductive depending upon the operating state of the flip-flop 115—116. Each time that a positive pulse is produced across resistor 130, a pulse is produced in the anode-circuit current of the conductive one of tubes 131 and 132, so that a train or sequence of pulses is produced either at lead 133 or at lead 134, selectively, depending upon the operating state of the flip-flop. Consequently, a positive electric pulse is produced at lead 133 for each recorded positive magnetic pulse, and a positive electric pulse is produced at lead 134 for each recorded negative magnetic pulse.

Each positive pulse produced at lead 133 triggers a pulse generator, which may be a conventional monostable flip-flop 135, which thereupon provides a separate positive electric pulse at ouput terminal 136. Each positive pulse produced at lead 134 triggers another pulse generator, which may be a conventional monostable flip-flop 137, which thereupon provides a separate negative electric pulse at output terminal 136. In this way a train or sequence of separate positive and negative electric pulses is produced that corresponds to curve 75 and represents the stored binary information.

Figure 9:
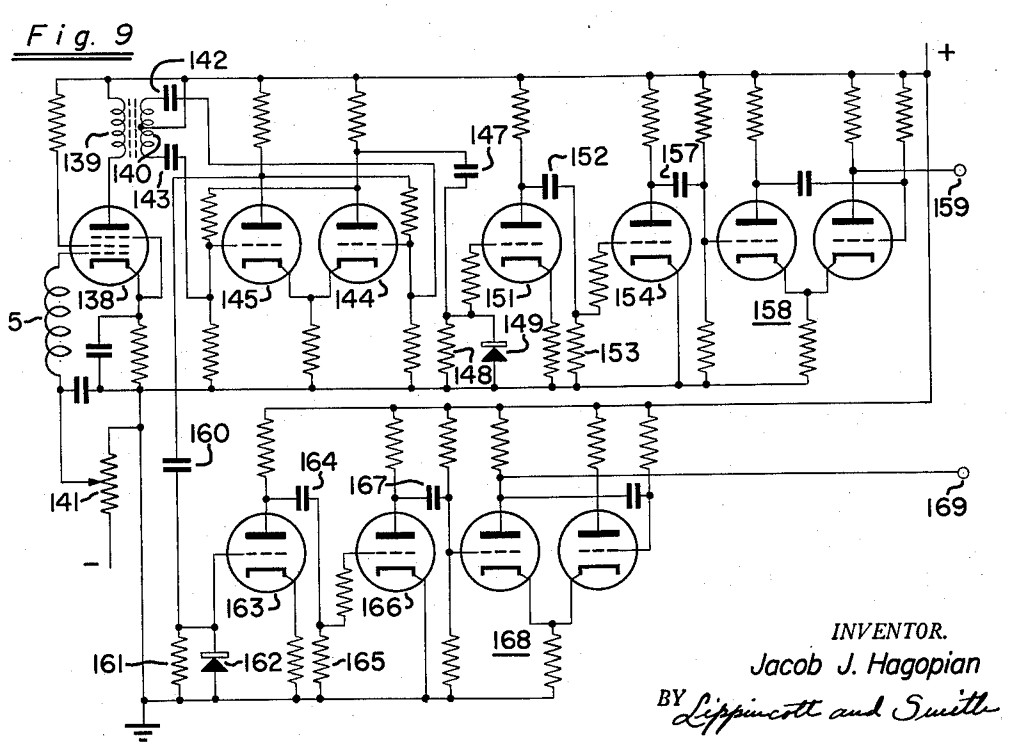
FIG. 9 is a simplified circuit diagram illustrating still another alternative embodiment of the invention.

Reference is now made to FIG. 9, which illustrates an embodiment in which a single bistable flip-flop performs the functions of the flip-flop and the biased rectifier of FIG. 5 and also performs the functions of the gate. Reproducing head winding 5 supplies a signal having a waveform similar to curve 76 to a conventional vacuum tube amplifier 138 connected to the primary 139 of a transformer having a tapped secondary 140. The gain or amplification factor of amplifier 138 is controlled by adjustable biasing means 141 which may, if desired, be automatically adjusted in accordance with the speed of disc 1 to provide signals of substantially the same amplitude regardless of variations in drum speed. Secondary 140 transmits through a capacitor 142 a signal having a waveform similar to curve 76, and transmits through a capacitor 143 an inverted replica of the same signal.

A conventional bistable electronic flip-flop comprises two triode vacuum tubes 144 and 145 having their control grids connected to capacitors 142 and 143, respectively. The flip-flop has two stable operating states, in a first one of which tube 144 is conductive while tube 145 is cut off, and in the second one of which tube 144 is cut off while tube 145 is conductive. The larger-amplitude signals produced from recorded magnetic pulses following magnetic pulses of the opposite polaritly trigger the flip-flop alternately from one to the other of its two operating states in the manner hereinbefore explained.

Assume that tube 144 is conductive while tube 145 is cut off. The signal transmitted to the control grid of tube 144 has a waveform similar to curve 76, so that there appears at the anode of tube 144 a voltage signal having a waveform similar to an inverted replica of curve 76. However, when a relatively large negative signal is produced by the reproducing head from a recorded negative magnetic pulse following a positive magnetic pulse, the flip-flop is triggered to its second stable operating state in which tube 144 is cut off, whereupon the anode potential of tube 144 rises to a value equal to the anode supply voltage. Consequently, the complete waveform of the anode potential of tube 144 is similar to curve 146 of FIG. 6.

Whenever the recorded magnetic pulses are of positive polarity, the signal at the anode of tube 144 has a ripple component with one cycle for each of the recorded magnetic pulses, but there is no ripple component at the anode of tube 144 when the recorded magnetic pulses are of negative polarity, as curve 146 clearly shows. The signal provided at the anode of tube 144 is differentiated by a differentiating circuit comprising a capacitor 147 and a resistor 148 connected in series. Negative portions of the differentiated signal are by-passed by a half-wave rectifier 149, and positive portions of the differentiated signal, having a waveform similar to curve 150 of FIG. 6, are applied to the control grid of a conventional vacuum-tube amplifier 151. Large positive peaks of this signal, produced when the flip-flop is triggered to a different operating state, are clipped by the grid current of tube 151. Each positive half-cycle applied to the control grid of amplifier tube 151 produces at the anode of the same tube a negative half-cycle which is differentiated by a differentiating circuit comprising a capacitor 152 and a resistor 153 in series. This differentiating circuit supplies to the control grid of vacuum tube amplifier 154 a signal having a waveform, represented by curve 155 of FIG. 6, consisting of a train of short negative pulses each followed by a short positive pulse. The positive pulses are clipped by saturation and grid-current characteristics of tube 154, and the negative pulses produce at the anode of tube 154 a sequence of short positive pulses, represented by curve 156 of FIG. 6, which are transmitted through a capacitor 157 and trigger a pulse generator, which may be a conventional monostable flip-flop 158, to produce separate positive electric pulses at output terminal 159 that correspond to the positive pulses of curve 75.

In a similar way, whenever flip-flop 144—145 is in its second stable operating state, a signal having a ripple component is produced at the anode of tube 145. This signal is differentiated by capacitor 160 and resistor 161, clipped by rectifier 162, amplified by vacuum tube amplifier 163, differentiated again by capacitor 164 and resistor 165, and further amplified and limited by vacuum tube amplifier 166. Consequently, for each recorded negative magnetic pulse there is transmitted through capacitor 167 a positive pulse that triggers a pulse generator, such as the conventional monostable flip-flop 168, to provide a separate negative electric pulse at output terminal 169 for each of the recorded negative pulses. Accordingly, a train or sequence of positive pulses is provided at terminal 159 and a train or sequence of negative pulses is provided at terminal 169, which represent the stored binary information in a form suitable for use by digital computers and other binary information-handling equipment. If only one set of these pulses is needed by the computer or other equipment, one of the pulse generators 158 and 168, and its associated driving circuits, may be omitted.

Additional alternative embodiments can be obtained by making different permutations and combinations of the parts and principles of the several embodiments herein specifically described. For example, a flip-flop can be used in place of the amplifier-limiter shown in FIGS. 1, 3 and 4 to produce a rectangular waveform signal similar to curve 25. Conversely, integrators and amplifier-limiters may be used in the embodiment shown in FIGS. 5 and 7 to produce rectangular waveform voltages for controlling the biased rectifier and gate. Furthermore other bistable devices that may be used in place of the flip-flops herein described are known to those skilled in the art, and there are many known types and variations of amplifiers, integrators, rectifiers, filters, gates, pulse generators and the like which may be used in practicing this invention.

Accordingly, it should be understood that this invention in its broader aspects is not limited to specific embodiments herein illustrated and described, and that the following claims are intended to cover all changes and modifications that do not depart from the true spirit and scope of the invention.

What is claimed is:

1. Apparatus for producing a train of separate pulses from a waveform composed of positive and negative non-rectangular pulses which are, at a selected rate, in overlapping relationship with respect to one another in an irregular sequence of polarities such that some adjacent ones of said pulses have like polarities while other adjacent ones of said pulses have unlike polarities, comprising means for producing from said waveform a ripple component having successive cycles occurring at the same rate as said overlapping pulses, and means triggered by each cycle of said ripple component and free of separate timing control to produce a separate pulse.

2. Apparatus for producing separate pulses from a continuous waveform composed of pulses of one polarity and pulses of another polarity overlapping one another in an irregular sequence of polarities such that some adjacent ones of said pulses have like polarities while other adjacent ones of said pulses have unlike polarities, the adjacent overlapping pulses of like polarity producing a rippled section of said waveform, comprising means for producing from said continuous waveform a ripple component having a cycle for each of said pulses, and means free of any separate timing control for providing a separate pulse for each of said cycles.

3. Apparatus for producing electric pulses from a recorded waveform composed of positive and negative recorded pulses overlapping one another in an irregular sequence of polarities such that some adjacent ones of said pulses have like polarities while other adjacent ones of said pulses have unlike polarities, comprising means for producing an electric signal from said recorded waveform, means for producing a ripple component from said electric signal, said ripple component having a cycle for each of said positive and negative recorded pulses, means for producing a first set of electric pulses consisting of one pulse for each cycle of said ripple component produced from positive recorded pulses, and means free of any separate timing control for providing a second set of electric pulses consisting of one pulse for each cycle of said ripple component produced from negative recorded pulses.

4. Apparatus for reproducing stored binary information from a recorded continuous magnetic waveform composed of magnetic pulses in an irregular sequence of two polarities such that some adjacent ones of said pulses have like polarities while other adjacent ones of said pulses have unlike polarities, the adjacent pulses of like polarity producing a rippled section of said waveform, comprising means for producing an electric signal from said magnetic waveform, means for producing a ripple component from said signal, said ripple component having a cycle for each of said magnetic pulses of each of said two polarities, and means free of any separate timing control for providing an electric pulse for each cycle of said ripple component produced from said magnetic pulses.

5. Apparatus for producing electric pulses from a recorded waveform composed of positive and negative recorded pulses in an irregular sequence of polarities such that some adjacent ones of said pulses have like polarities while other adjacent ones of said pulses have unlike polarities, the adjacent pulses of like polarity producing a rippled section of said waveform having one ripple cycle per pulse, comprising means for producing an electric signal from said recorded waveform, means for inverting portions of said signal produced from said positive recorded pulses relative to portions of said signal produced from said negative recorded pulses, thereby producing a ripple component having a cycle for each of said recorded pulses, means for providing a first set of electric pulses consisting of one pulse for each cycle of said ripple component produced from positive recorded pulses, and means free of any separate timing control for providing a second set of electric pulses consisting of one pulse for each cycle of said ripple component produced from negative recorded pulses.

6. Apparatus for reproducing stored binary information from a recorded magnetic waveform composed of overlapping positive and negative magnetic pulses in an irregular sequence of polarities such that some adjacent ones of said pulses have like polarities while other adjacent ones of said pulses have unlike polarities, the adjacent overlapping pulses of like polarity producing a rippled section of said waveform having one ripple cycle per pulse, comprising means for producing an electric signal from said magnetic waveform, rectifier means for inverting portions of said signal produced from negative magnetic pulses relative to portions of said signal produced from positive magnetic pulses, thereby producing a ripple component having successive cycles occurring at the same rate as said magnetic pulses, a filter transmitting only said ripple component, and means for providing an electric pulse at each cycle of the filtered ripple component produced from the magnetic pulses.

7. Apparatus for producing separate pulses from a waveform composed of positive and negative pulses overlapping one another in an irregular sequence of polarities such that some adjacent ones of said pulses have like polarities while other adjacent ones of said pulses have unlike polarities, the adjacent overlapping pulses of like polarity producing a rippled section of said waveform having one ripple cycle per pulse, comprising means for inverting negative portions of said waveform relative to positive portions of said waveform, thereby producing a ripple component having successive cycles occurring at the same rate as said overlapping pulses, and means free of any separate timing control for providing a separate pulse at each cycle of said ripple component only when said waveform has a selected polarity.

8. Apparatus for producing separate pulses from a waveform composed of overlapping positive and negative pulses in an irregular sequence of polarities such that some adjacent ones of said pulses have like polarities while other adjacent ones of said pulses have unlike polarities, the adjacent overlapping pulses of like polarity producing a rippled section of said waveform having one ripple cycle per pulse, comprising means for inverting negative portions of said waveform relative to positive portions of said waveform, thereby producing a ripple component having successive cycles occurring at the same rate as said overlapping pulses, a pulse generator triggered by each cycle of said ripple component to produce a train of separate pulses, and a gate controlled free of separate timing control by the polarity of said waveform to transmit only selected ones of said separate pulses.

9. Apparatus for producing a train of separate electric pulses from a recorded waveform composed of overlapping positive and negative recorded pulses in an irregular sequence of polarities such that some adjacent ones of said pulses have like polarities while other adjacent ones of said pulses have unlike polarities, the adjacent overlapping pulses of like polarity producing a rippled section of said waveform having one ripple cycle per pulse, comprising means for producing an electric signal having a waveform similar to said recorded waveform, means for inverting negative portions of said signal relative to positive portions of said signal, thereby producing a ripple component having successive cycles occurring at the same rate as said recorded pulses, and means free of any separate timing control for providing an electric pulse at each cycle of said ripple component only when said electric signal has a selected polarity.

10. Apparatus for producing electric pulses from a recorded waveform composed of overlapping positive and negative recorded pulses in an irregular sequence of polarities such that some adjacent ones of said pulses have like polarities while other adjacent ones of said pulses have unlike polarities, the adjacent overlapping pulses of like polarity producing a rippled section of said waveform having one ripple cycle per pulse, comprising means for producing an electric signal from said recorded waveform, means for inverting portions of said signal produced from positive recorded pulses relative to portions of said signal produced from negative recorded pulses, thereby producing a ripple component having a cycle for each of said recorded pulses, means for producing a first set of electric pulses consisting of one pulse for each cycle of said ripple component, means for producing a second set of electric pulses consisting of one pulse for each cycle of said ripple component, means for transmitting electric pulses of said first set only when the polarity of said waveform is positive, and means for transmitting electric pulses of said second set only when the polarity of said waveform is negative.

11. Apparatus for reading stored binary information from a recorded magnetic waveform of overlapping positive and negative magnetic pulses in an irregular sequence of polarities such that some adjacent ones of said pulses have like polarities while other adjacent ones of said pulses have unlike polarities, the adjacent overlapping pulses of like polarity producing a ripple section of said waveform having one ripple cycle per pulse, comprising a transducer for producing an electric signal having a waveform similar to the first differential of said magnetic waveform, an integrator for integrating said signal to produce an integrated signal having portions of opposite polarity produced from said positive and negative magnetic pulses, respectively, a full-wave rectifier for inverting portions of said integrated signal produced from negative magnetic pulses relative to portions of said integrated signal produced from positive magnetic pulses, thereby producing a ripple component having successive cycles occurring at the same rate as said magnetic pulses, a filter for transmitting only said ripple component, a pulse generator triggered by each cycle of the filtered ripple component to produce a train of electric pulses, and a gate controlled by the polarity of said integrated signal to transmit only selected ones of said electric pulses.

12. Apparatus for recording stored binary information from a record carrying a recorded magnetic waveform composed of overlapping positive and negative magnetic pulses in an irregular sequence of polarities such that some adjacent ones of said pulses have like polarities while other adjacent ones of said pulses have unlike polarities, the adjacent overlapping pulses of like polarity producing a rippled section of said waveform having one ripple cycle per pulse, comprising a reproducing head, means for moving successive portions of said record past said reproducing head to produce an electric signal having a waveform similar to the first differential of said recorded magnetic waveform, an electrical integrator connected to integrate said signal and to provide an integrated electric signal having a waveform similar to said recorded magnetic waveform, a full-wave rectifier connected to invert negative portions of said integrated signal relative to positive portions of said integrated signal, thereby producing an electric ripple component having one cycle for each magnetic pulse of either polarity that passes said reproducing head, a pulse generator triggered by each cycle of said ripple component to produce a positive and a negative electric pulse, and a gate controlled by the polarity of said integrated signal to transmit either said positive electric pulse or said negative electric pulse selectively.

13. Apparatus for reading stored binary information from a recorded magnetic waveform composed of overlapping positive and negative magnetic pulses in an irregular sequence of polarities such that some adjacent ones of said pulses have like polarities while other adjacent ones of said pulses have unlike polarities, the adjacent overlapping pulses of like polarity producing a rippled section of said waveform having one ripple cycle per pulse, comprising means for producing a first electric signal having a waveform similar to the first differential of said magnetic waveform, means for producing a second electric signal having a waveform similar to that of said first signal but of opposite polarity, first and second electrical integrators for integrating said first and second signals to produce first and second integrated signals of opposite polarity, a pair of grid-controlled vacuum tubes having their cathodes connected together, connections for supplying said first integrated signal to the control grid of one of said tubes and supplying said second integrated signal to the control grid of the other of said tubes, thereby producing at the cathodes of said tubes an electric ripple component having one cycle for each magnetic pulse of either polarity, means for providing an electric pulse for each cycle of said ripple component produced from magnetic pulses of positive polarity, and other means for providing an electric pulse for each cycle of said ripple component produced from magnetic pulses of negative polarity.

14. Apparatus for producing separate pulses from a waveform composed of overlapping positive and negative pulses in an irregular sequence of polarities such that some adjacent ones of said pulses have like polarities while other adjacent ones of said pulses have unlike polarities, the adjacent overlapping pulses of like polarity producing a rippled section of said waveform having one ripple cycle per pulse, comprising means for producing from said waveform a signal similar to the first differential of said waveform, means for inverting portions of said signal produced from negative portions of said waveform relative to portions of said signal produced from positive portions of said waveform, thereby producing a ripple component having successive cycles occurring at the same rate as said overlapping pulses, and means free of any separate timing control for providing a separate pulse at each cycle of said ripple component only when said waveform has a selected polarity.

15. Apparatus for producing electric pulses from a recorded waveform composed of overlapping positive and negative recorded pulses in an irregular sequence of polarities such that some adjacent ones of said pulses have like polarities while other adjacent ones of said pulses have unlike polarities, the adjacent overlapping pulses of like polarity producing a rippled section of said waveform having one ripple cycle per pulse, comprising means for producing an electric signal from said recorded waveform, means for inverting portions of said signal produced from negative recorded pulses relative to portions of said signal produced from positive recorded pulses, thereby producing a ripple component having a cycle for each of said recorded pulses, first gating means for transmitting said ripple component only when the polarity of said waveform is positive, second gating means for transmitting said ripple component only when the polarity of said waveform is negative, means for producing a first set of electric pulses consisting of one pulse for each cycle of said ripple component transmitted by said first gating means, and means free of any separate timing control for producing a second set of electric pulses consisting of one pulse for each cycle of said ripple component transmitted by said second gating means.

16. Apparatus for reading stored binary information from a recorded waveform composed of overlapping positive and negative magnetic pulses in an irregular sequence of polarities such that some adjacent ones of said pulses have like polarities while other adjacent ones of said pulses have unlike polarities, the adjacent overlapping pulses of like polarity producing a rippled section of said waveform having one ripple cycle per pulse, comprising a transducer for producing an electric signal having a waveform similar to the first differential of said magnetic waveform, said signal having portions of larger amplitude produced from magnetic pulses that follow magnetic pulses of the opposite polarity and having portions of smaller amplitude produced from magnetic pulses that follow magnetic pulses of the same polarity, a bistable device triggered to first and second states alternately by said larger-amplitude portions of said signal, means for providing a ripple component under the control of the bistable device, said ripple component having one cycle for each magnetic pulse, and a pulse generator triggered by each cycle of said ripple component to produce an electric pulse.

17. Apparatus for reading stored binary information from a recorded magnetic waveform composed of overlapping positive and negative magnetic pulses in an irregular sequence of polarities such that some adjacent ones of said pulses have like polarities while other adjacent ones of said pulses have unlike polarities, the adjacent overlapping pulses of like polarity producing a rippled section of said waveform having one ripple cycle per pulse, comprising a transducer for producing an electric signal having a waveform similar to the first differential of said magnetic waveform, said signal having portions of larger amplitude produced from magnetic pulses that follow magnetic pulses of the opposite polarity and having portions of smaller amplitude produced from magnetic pulses that follow magnetic pulses of the same polarity, a bistable device triggered to first and second states alternately by said larger-amplitude portions of said signal, means controlled by the state of said device to invert portions of said signal produced from negative magnetic pulses relative to portions of said signal produced from positive magnetic pulses, thereby producing a ripple component having successive cycles occurring at the same rate as said magnetic pulses, a filter for transmitting only said ripple component, a gate controlled by the state of said device to transmit only selected cycles of the filtered ripple component, and a pulse generator triggered by each of said selected cycles to produce an electric pulse.

18. Apparatus for reading stored binary information from a recorded magnetic waveform composed of overlapping positive and negative magnetic pulses in an irregular sequence of polarities such that some adjacent ones of said pulses have like polarities while other adjacent ones of said pulses have unlike polarities, the adjacent overlapping pulses of like polarity producing a rippled section of said waveform having one ripple cycle per pulse, comprising a transducer for producing an electric signal having a waveform similar to the first differential of said magnetic waveform, said signal having portions of larger amplitude produced from magnetic pulses that follow magnetic pulses of the opposite polarity and having portions of smaller amplitude produced from magnetic pulses that follow magnetic pulses of the same polarity, a bistable device triggered to first and second states alternately by said larger-amplitude portions of said signal, a biased rectifier controlled by the state of said device to invert portions of said signal produced from negative magnetic pulses relative to portions of said signal produced from positive magnetic pulses, thereby producing a ripple component having successive cycles occurring at the same rate as said magnetic pulses, a filter for transmitting only said ripple component, a gate controlled by the state of said device to transmit only selected cycles of the filtered ripple component, and a pulse generator triggered by each of said selected cycles to produce an electric pulse.

19. Apparatus for reading stored binary information from a record carrying a recorded magnetic waveform composed of overlapping positive and negative magnetic pulses in an irregular sequence of polarities such that some adjacent ones of said pulses have like polarities while other adjacent ones of said pulses have unlike polarities, the adjacent overlapping pulses of like polarity producing a rippled section of said waveform having one ripple cycle per pulse, comprising a reproducing head, means for moving successive portions of said record past said reproducing head to produce an electric signal having a waveform similar to the first differential of said recorded magnetic waveform, said signal having portions of larger amplitude produced from magnetic pulses that follow magnetic pulses of opposite polarity and having portions of smaller amplitude produced from magnetic pulses that follow magnetic pulses of the same polarity, a bistable electronic flip-flop having two stable states of operation, said flip-flop being triggered from one to the other of said states alternately by said larger-amplitude portions of said signal, a biased rectifier controlled by the state of said flip-flop to invert and to transmit said signal when said flip-flop is in one of said states and to transmit said signal without inversion when said flip-flop is in the other of said states, thereby producing an electric ripple component having one cycle for each magnetic pulse of either polarity which passes said reproducing head, gating means controlled by the state of said flip-flop and having two output terminals, said gating means transmitting said ripple component to one of said output terminals when said flip-flop is in one of said states and transmitting said ripple component to the other of said output terminals when said flip-flop is in the other of said states, a first pulse generator triggered to produce an electric pulse by each cycle of said ripple component transmitted to said first output terminal of said gating means, and a second pulse generator triggered to produce an electric pulse by each cycle of said ripple component transmitted to said second output terminal of said gating means.

20. Apparatus for reading stored binary information from a recorded magnetic waveform composed of overlapping positive and negatice magnetic pulses in an irregular sequence of polarities such that some adjacent ones of said pulses have like polarities while other adjacent ones of said pulses have unlike polarities, the adjacent overlapping pulses of like polarity producing a rippled section of said waveform having one ripple cycle per pulse, comprising a transducer for producing an electric signal having a waveform similar to the first differential of said magnetic waveform, said signal having portions of larger amplitude produced from magnetic pulses that follow magnetic pulses of the opposite polarity and having portions of smaller amplitude produced from magnetic pulses that follow magnetic pulses of the same polarity, a bistable device triggered to first and second states alternately by said larger-amplitude portions of said signal, a rectifier device connected to receive the signal produced by the transducer, means to control the rectifier device from the bistable device for inverting portions of said signal produced from negative magnetic pulses relative to portions of said signal produced from positive magnetic pulses, thereby producing a ripple component having successive cycles occurring at the same rate as said magnetic pulses, a filter for transmitting only said ripple component, a gate controlled by the state of said device to transmit only selected cycles of the filtered ripple component, and a pulse generator triggered by each of said selected cycles to produce an electric pulse.

21. Apparatus for reading stored binary information from a record carrying a recorded magnetic waveform composed of overlapping positive and negative magnetic pulses in an irregular sequence of polarities such that some adjacent ones of said pulses have like polarities while other adjacent ones of said pulses have unlike polarities, the adjacent overlapping pulses of like polarity producing a rippled section of said waveform having one ripple cycle per pulse, comprising a reproducing head, means for moving successive portions of said record past said reproducing head to produce an electric signal having a waveform similar to the first differential of said recorded magnetic waveform, said signal having portions of larger amplitude produced from magnetic pulses that follow magnetic pulses of the opposite polarity and having portions of smaller amplitude produced from magnetic pulses that follow magnetic pulses of the same polarity, a bistable electronic flip-flop having two stable states of operation, said flip-flop being triggered from one to the other of said states alternately by said larger-amplitude portions of said signal, said flip-flop including two grid-controlled vacuum tubes so arranged that a different one of said tubes conducts current in each of said two states, said tubes having their cathodes connected together, means for supplying said signal to the control grid of one of said tubes, means for supplying an inverted replica of said signal to the control grid of the other of said tubes, thereby producing at the cathodes of said tubes an electric ripple component having one cycle for each magnetic pulse of either polarity that passes said reproducing head, means for producing a positive electric pulse at each cycle of said ripple component when said flip-flop is in one of said states, and means for producing a negative electric pulse at each cycle of said ripple component when said flip-flop is in the other of said states.

22. Apparatus for producing separate pulses from a wavefrom composed of overlapping positive and negative nonrectangular pulses in an irregular sequence of polarities such that some adjacent ones of said pulses have like polarities while other adjacent ones of said pulses have unlike polarities, comprising means for producing from said waveform a signal similar to the first differential of said waveform, means for producing a ripple component from said signal, said ripple component having one cycle for each of said overlapping pulses, and means free of any separate timing control for providing a separate pulse at each of said cycles.

23. Apparatus for reading stored binary information from a recorded magnetic waveform composed of overlapping positive and negative magnetic pulses in an irregular sequence of polarities such that some adjacent ones of said pulses have like polarities while other adjacent ones of said pulses have unlike polarities, the adjacent overlapping pulses of like polarity producing a rippled section of said waveform, comprising a transducer for producing an electric signal having a waveform similar to the first differential of said magnetic waveform as recorded, said signal having portions of larger amplitude produced from magnetic pulses that follow magnetic pulses of the opposite polarity and having portions of smaller amplitude produced from magnetic pulses that follow magnetic pulses of the same polarity, a rectifier to receive signal output from the transducer, a bistable device also connected to receive signal output from the transducer so as to be triggered to first and second states alternately by said larger-amplitude portions of said signal, said rectifier device having an output terminal at which a ripple component is produced only when said bistable device is in said first state, said ripple component having one cycle for each of said magnetic pulses, and a pulse generator triggered by each cycle of said ripple component to produce an electric pulse.

24. Apparatus for reading stored binary information from a record carrying a recorded magnetic waveform composed of overlapping positive and negative magnetic pulses in an irregular sequence of polarities such that some adjacent ones of said pulses have like polarities while other adjacent ones of said pulses have unlike polarities, the adjacent overlapping pulses of like polarity producing a rippled section of said waveform having one ripple cycle per pulse, comprising a reproducing head, means for moving successive portions of said record past said reproducing head to produce an electric signal having a waveform similar to the first differential of said recorded magnetic waveform, said signal having portions of larger amplitude produced from magnetic pulses that follow magnetic pulses of the opposite polarity and having portions of smaller amplitude produced from magnetic pulses that follow magnetic pulses of the same polarity, a bistable electronic flip-flop having two stable states of operation, said flip-flop being triggered from one to the other of said states alternately by said larger-amplitude portions of said signal, said flip-flop including two grid-controlled vacuum tubes so arranged that a different one of said tubes conducts current in each of said two states, means for supplying said signal to the control grid of one of said tubes, means for supplying an inverted replica of said signal to the control grid of the other of said tubes, thereby producing at the anode of the conducting one of said tubes an electric ripple component having one cycle for each of said magnetic pulses, means for producing an electric pulse for each cycle of said ripple component produced at the anode of one of said tubes, and other means for producing an electric pulse at each cycle of said ripple component produced at the anode of the other of said tubes.

References Cited in the file of this patent

UNITED STATES PATENTS

| | | |
|---|---|---|
| 2,470,722 | Rattner | May 17, 1949 |
| 2,700,149 | Stone | Jan. 18, 1955 |
| 2,700,155 | Clayden | Jan. 18, 1955 |
| 2,704,361 | Pouliart et al. | Mar. 15, 1955 |
| 2,764,463 | Lubkin et al. | Sept. 25, 1956 |
| 2,797,401 | Green et al. | June 25, 1957 |
| 2,804,605 | De Turk | Aug. 27, 1957 |
| 2,890,440 | Burkhart | June 9, 1959 |
| 2,896,192 | Husman | July 21, 1959 |

OTHER REFERENCES

"High Density Recording for Digital Computers," Tele-Tech and Electronic Industries, November 1955.